United States Patent
Xia et al.

(10) Patent No.: US 9,943,089 B2
(45) Date of Patent: Apr. 17, 2018

(54) FOOD PROTEIN INGREDIENT AND METHODS FOR PRODUCING

(71) Applicant: Mars, Incorporated, McLean, VA (US)

(72) Inventors: Huan Xia, McLean, VA (US); Michael William Merkel, McLean, VA (US); Emine Unlu, McLean, VA (US); Shannon Lee Abts, McLean, VA (US); Paul Richard Mathewson, McLean, VA (US); Gaetan Luc Dominique Danset, McLean, VA (US); Lucio Yonemoto, McLean, VA (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 13/671,492

(22) Filed: Nov. 7, 2012

(65) Prior Publication Data
US 2013/0209611 A1    Aug. 15, 2013

Related U.S. Application Data

(60) Provisional application No. 61/556,701, filed on Nov. 7, 2011, provisional application No. 61/556,707, filed on Nov. 7, 2011, provisional application No. 61/556,714, filed on Nov. 7, 2011, provisional application No. 61/556,720, filed on Nov. 7, 2011.

(51) Int. Cl.
*A23J 3/34* (2006.01)
*A23K 20/147* (2016.01)
*A23K 50/40* (2016.01)

(52) U.S. Cl.
CPC ............. *A23J 3/341* (2013.01); *A23K 20/147* (2016.05); *A23K 50/40* (2016.05)

(58) Field of Classification Search
CPC ... A23J 1/10; A23J 3/341; A23J 1/002; A61K 8/64; A23K 1/106; A23K 1/1653; A23K 1/1656; A23K 1/00; A23L 1/0047
USPC ........... 426/56, 59, 657, 807, 623, 302, 805; 530/357
See application file for complete search history.

(56) References Cited

U.S. PATENT DOCUMENTS

| | | | |
|---|---|---|---|
| 3,642,498 A * | 2/1972 | Anker | 426/302 |
| 3,970,614 A * | 7/1976 | Goodwin | 530/357 |
| 4,439,522 A | 3/1984 | Schenk | |
| 5,262,307 A * | 11/1993 | Savolainen | A61K 8/65 435/68.1 |
| 9,107,867 B2 | 8/2015 | Zanghi et al. | |
| 2006/0233913 A1 | 10/2006 | Hansen | |
| 2007/0141230 A1 | 6/2007 | Chenault et al. | |
| 2008/0280274 A1 | 11/2008 | Freisen et al. | |
| 2009/0297495 A1 | 12/2009 | Kerovuo et al. | |
| 2014/0093609 A1 | 4/2014 | Roy et al. | |

FOREIGN PATENT DOCUMENTS

| | | |
|---|---|---|
| DE | 3539231 | 5/1987 |
| GB | 2112620 | 7/1983 |
| GB | 2315674 | 2/1998 |
| JP | 06046871 | 2/1994 |
| WO | 0195739 | 12/2001 |
| WO | WO2006065469 A1 | 6/2006 |
| WO | 2010102362 | 9/2010 |

OTHER PUBLICATIONS

JP-06-046-871—(1994). Machine Translation.*
Ramnani, P. et al. World J. Microbiol Biotechnol (2007) 23: 1537-1540.*
Grazziotin, A. et al. Animal Feed Sci. Technol. (2006); 126: 135-144.*
Lennox, F. G. 1951. Digestion of wool keratin by papain bisulphite-urea and related system.*
Takami, H. et al. Biosci. Biotech. Biochem., 56: 1667-1669 (1992).*
Brandelli, et al., "Biochemical Features of Microbial Keratinases and Their Production and Applications", Appl. Microbiol. Biotechnol, 2010, 85:1735-1750.
Dalev, "Utilisation of Waste Feathers from Poultry Slaughter for Production of a Protein Concentrate", Biosource Technology, 48(1994), 265-267.
Gupta, et al., "Bacterial Alkaline Proteases: Molecular Approaches and Industrial Applications", Appl. Microbiol. Biotechnol. (2002), 59: 15-32.
Mukherjee, et al., "Biodegradation of Waste Chicken-Feathers by an Alkaline beta-Keratinase (Muartinase) Purified from a Mutant Brevibacillus sp. Strain AS-S10-II", International Biodeterioration & Biodegradation, vol. 65, No. 8, Sep. 6, 2011, pp. 1229-1237.

(Continued)

*Primary Examiner* — Hamid R Badr
(74) *Attorney, Agent, or Firm* — Mars, Incorporated

(57) ABSTRACT

The present invention relates generally to a method for enzymatic production of food protein ingredients from keratin-containing proteinaceous materials and the resulting compositions. The process includes treating a proteinaceous containing material with an amount of a reducing agent, followed by hydrolysis of the keratin by a proteolytic enzyme to efficiently and economically convert a keratinaceous protein source into a palatable, highly digestible protein food product.

9 Claims, No Drawings

(56) References Cited

OTHER PUBLICATIONS

Onifade, et al., "A Review: Potentials for Biotechnological Applications of Keratin-Degrading Microorganisms and their Enzymes for Nutritional Improvement of Feathers and Other Keratins as Livestock Feed Resources", Bioresource Technology, 66 (1998) pp. 1-11.

Ehen, et al., "Thermal Characterization of Hair Using Tg-ms Combined Thermoanalytical Technique", Journal of Thermal Analysis and Calorimetry, (Nov. 2004), vol. 78, pp. 427-440.

Hamada, "Effect of amino acids and glucose on exercise-induced gut and skeletal muscle proteolysis in dogs", Metabolism, Clinical and Experimental, W.B. Saunders Co., Philadelphia, PA, US, vol. 40, No. 2, Feb. 1999, 161-166.

Mintel, "Brazilian Pet Food: Complete Food for Adult Dogs", Apr. 2013, 2 pages.

Ramnani, et al., "Keratinolytic Potential of Bacilus Licheniformis RG1: Structural and Biochemical mechanism of Feather Degradation", Canadian Journal of Microbiology, 2005, vol. 51, pp. 191-196.

Rebafka, et al., "Adding Value to Feathers; Goldmehl: A new potential for the Pet Food Industry", Retrieved from the Internet: URL:http://www.petfoodindustry.com/uploadedfiles/PetFoodIndustry/Articles/1003PETnovel%20feather%meal.pdf, retrieved on Sep. 29, 2014.

\* cited by examiner

FOOD PROTEIN INGREDIENT AND METHODS FOR PRODUCING

FIELD OF THE INVENTION

The present invention relates generally to a method for enzymatic production of food protein ingredients from keratin-containing proteinaceous materials and the resulting compositions. More particularly, it is concerned with processes for producing food proteins from keratin-containing sources by denaturing pretreatment of the keratin, followed by hydrolysis of the keratin by proteolytic enzymes to efficiently and economically convert a keratinaceous protein source into a palatable, highly digestible protein food product.

BACKGROUND

World population growth is well known to exert corresponding pressure on the food supply. As population increases, already costly food ingredients, such as food protein, may become prohibitively expensive for consumption by pets and companion animals. Thus, there is a need for alternative protein sources which do not compete with the human food chain. Such alternative protein sources include typical animal byproducts, such as feathers, hair, fur, wool, bristles, horns, hooves, nails, claws, beaks, outer layer of animal skin, tortoise and turtle shells, whale baleen, porcupine quills and scales, which contain fibrous structural proteins in the keratin family. While keratin protein materials are generally abundant, cheap and sustainable, they also contain relatively high percentages of sulfur-containing amino acids such as cysteine. Cysteine can form disulfide bonds which contribute to the tertiary structure of the keratin protein, making it strong and durable. That structural durability results in low digestibility and makes keratin proteins generally unsuitable in their natural state for use as a source of food grade proteins.

Previous attempts to convert raw keratin-containing material into food grade protein materials have been costly, and resulted in products which were unpalatable and low in protein digestibility. As a result, such keratin-containing raw materials have traditionally been treated as agricultural waste and assigned to disposal or recycling.

Keratin-containing materials can be denatured by subjecting them to harsh physical conditions such as relatively high heat and pressure, for example at 146° C. and 345 kPa for about 30 to 70 minutes. Such treatment can facilitate breakdown of the sulfide bonds, but only incompletely hydrolyzes the keratin. In addition, such conditions are destructive to certain amino acids and may lead to the production of undesirable sulfur-containing non-nutritive amino acids in the end products.

Chemical treatment may also be used to break the disulfide bonds and can generate relatively shorter peptides from keratin. For example, boiling keratin for about 2 to 20 hours at a pH less than or equal to 2.0 to 4.0, or boiling for more than two hours at a highly alkaline pH yielded oligopeptides, polypeptides and free amino acids. However, such harsh treatments may partially or completely destroy certain amino acids, thereby reducing the nutritional aspects of the end product. Alkaline hydrolysis in particular tends to yield undesirable artificial amino acids such as lanthionine and lysinoalanine, the latter of which has been implicated as a renal toxic factor in laboratory rats. Treatment with acidic or basic materials may also produce residual salts in the mixture, which may necessitate additional processing steps for removal.

Thus, hydrolysis of keratin-containing materials by means of harsh treatments such as heat and chemicals suffers from the problems of incomplete hydrolysis and contamination of the food product with undesirable amino acids and residual salts. Moreover, such methods have not been successful in producing highly digestible food products. These methods generally do not yield products having digestibility greater than about 80% as measured by the 2-step method of Boisen and Fernandez (1995).

Accordingly, there is a need for a process that will convert keratin-containing proteinaceous material into a desirable food product ingredient that is nutritious, palatable, and highly digestible by an animal. The desired process should be suitable for use to pretreat protein-containing raw materials, particularly, abundant, sustainable, low cost keratin-containing raw materials, under mild conditions to loosen tightly-packed beta-sheet structure, thereby allowing subsequent enzymatic hydrolysis to efficiently break the peptide bonds of the keratin. The food product should be relatively free of undesirable amino acids and should not require additional processing or minimal processing to remove residual salts, and should also be amenable to industrial processing.

SUMMARY OF THE INVENTION

The present invention provides an improved process for preparing food protein ingredients that involves pretreatment of keratin-containing raw material by contacting a quantity of the material with a reducing agent and heating to create a proteinaceous mixture. The pretreated raw material is then subjected to enzyme hydrolysis by mixing a quantity of at least one proteolytic enzyme in an aqueous solution to react with the pretreated proteinaceous mixture to produce a protein slurry. The protein slurry is subjected to an emulsification process and incubated for a time sufficient to produce a food protein ingredient.

Various objects and advantages of this process and its compositions will become apparent from the following description taken in conjunction with the accompanying drawings which set forth, by way of illustration and example, certain embodiments of the process and resulting compositions.

In one aspect, the invention provides a process for preparing a food protein ingredient. In general, the method includes the steps of providing a quantity of a protein-containing material from any raw material containing a quantity of protein, wherein the protein-containing material contains keratin, contacting the protein-containing material with a composition selected from the group consisting of a reducing agent, a chaotropic agent, a detergent, and mixtures thereof, heating the contacted protein-containing material to create a proteinaceous mixture, mixing a quantity of a proteolytic enzyme in an aqueous solution to produce a proteolytic enzyme solution and contacting the proteinaceous mixture with the proteolytic enzyme solution to produce a protein and enzyme mixture, processing the protein and enzyme mixture through a size-reduction process to produce a size-reduced protein and enzyme mixture, and incubating the size-reduced protein and enzyme mixture for a time sufficient to produce the food protein ingredient.

In some aspects of the invention, the process further includes the step of contacting the protein-containing material with a quantity of water.

In general, the reducing agent is selected from the group consisting of sodium metabisulfite, sodium sulfite, sodium bisulfite, calcium sulfite, phosphites, 2-mercaptoethanol, Bis (2-mercaptoethyl)sulfone, 2,3-dimercapto-1-propanol, dithiothreitol, dithiobutylamine, L-cysteine, cysteine ethyl ester, cysteine methyl ester, trialkylphosphines, tris(2-carboxyethyl) phosphine hydrochloride, and combinations thereof.

In general, the chaotropic agent is selected from the group consisting of urea, thiourea, guanidine salts, and combinations thereof.

In general, the detergent is selected from the group consisting of sodium dodecyl sulfate (SDS), ethyl trimethyl ammonium bromide, Triton X-100, (1,1,3,3-tetramethylbutyl)phenyl-polyethylene glycol, Polyethylene glycol tert-octylphenyl ether sold by under the trademark Triton® X-114 by The Dow Chemical Company and its licensees, a polyoxyethylene (20) sorbitan monolaurate (polysorbate-20), a polyoxyethylene (20) sorbitan monopalmitate (polysorbate-40), a polyoxyethylene (20) monostearate (polysorbate-60), a polyoxyethylene (20) monooleate (polysorbate-80), octyl glucoside, octyl thioglucoside, 3-[(3-cholamidopropyl) dimethylammonio]-1-propanesulfonate (CHAPS), 3-[(3-cholamidopropyl)dimethylammonio}-2-hydroxy-1-propanesulfonate (CHAPSO) and combinations thereof.

Preferred forms of the size-reduction process is selected from the group consisting of grinding, milling, chopping, cutting, dicing, shredding, emulsifying, homogenizing, high pressure homogenizing and combinations thereof.

In general, the proteolytic enzyme is selected from the group consisting of endoproteases, exoproteases, exogenous enzymes, endogenous enzymes, and combinations thereof. Preferred endoprotease enzymes are selected from the group consisting of bromelians, cathepsin, calpain, ficain, chymopapain, streptopain, papain subtilisins, alcalase and keratinase and combinations thereof In some forms of the invention, the proteinaceous mixture is contacted and mixed with more than one proteolytic enzyme.

It is understood that the size-reduction process can be carried out or performed before, during, and/or after contacting the proteinaceous mixture with the proteolytic enzyme.

In some preferred forms, the food protein ingredient is further processed through centrifugation, filtration, or decanting.

In another aspect, the present invention provides a food ingredient composition produced from an aspect of the invention, such as any of the ones described herein. Preferably the food ingredient has at least about 85% protein digestibility based on the 2-step Boisen method. More preferably, the food ingredient has from 90% to about 100% protein digestibility based on the 2-step Boisen method. In some preferred forms, at least 2% of the total amino acids are sulfur-containing amino acids. In other preferred forms, the food ingredient includes or also includes a quantity of available free amino acids.

In another aspect, the present invention provides a food ingredient composition comprising a protein source derived from a keratin-based material and having at least about 85% protein digestibility based on the 2-step Boisen method. In preferred forms, the food ingredient has from 90% to about 100% protein digestibility based on the 2-step Boisen method.

The food ingredient composition described and produced herein can be used as an ingredient in food for any animal including humans, pets, livestock, wild animals, and the like. One preferred use is as a pet food ingredient.

In another aspect, the present invention provides a pet food comprising a protein source derived from a keratin-based material and having at least about 85% protein digestibility based on the 2-step Boisen method. In preferred forms, the pet food has from 90% to about 100% protein digestibility based on the 2-step Boisen method.

In another aspect, the present invention provides a pet food coating composition comprising a protein source derived from a keratin-based material and having at least about 85% protein digestibility based on the 2-step Boisen method. In preferred forms, the pet food coating composition has from 90% to about 100% protein digestibility based on the 2-step Boisen method.

In another aspect, the present invention provides a process for preparing a food protein ingredient. In general, the process includes the steps of providing a quantity of a protein-containing material (which can be any raw material containing a quantity of protein), wherein the protein-containing material contains keratin; contacting the protein-containing material with a composition selected from the group consisting of a reducing agent, a chaotropic agent, a detergent, and mixtures thereof; heating the contacted protein-containing material to create a proteinaceous mixture; mixing a quantity of a proteolytic enzyme in an aqueous solution to produce a proteolytic enzyme solution and contacting the proteinaceous mixture with the proteolytic enzyme solution to produce a protein and enzyme mixture; and, incubating the protein and enzyme mixture for a time sufficient to produce the food protein ingredient. In some forms of the invention, the process further includes the step of contacting the protein-containing material with a quantity of water.

Preferred reducing agents are selected from the group consisting of sodium metabisulfite, sodium sulfite, sodium bisulfite, calcium sulfite, phosphites, 2-mercaptoethanol, Bis (2-mercaptoethyl)sulfone, 2,3-dimercapto-1-propanol, dithiothreitol, dithiobutylamine, L-cysteine, cysteine ethyl ester, cysteine methyl ester, trialkylphosphines, tris(2-carboxyethyl) phosphine hydrochloride, and combinations thereof.

Preferred chaotropic agents are selected from the group consisting of urea, thiourea, guanidine salts, and combinations thereof.

Preferred detergents are selected from the group consisting of sodium dodecyl sulfate (SDS), ethyl trimethyl ammonium bromide, Triton X-100, (1,1,3,3-tetramethylbutyl)phenyl-polyethylene glycol, Polyethylene glycol tert-octylphenyl ether sold by under the trademark Triton® X-114 by The Dow Chemical Company and its licensees, a polyoxyethylene (20) sorbitan monolaurate (polysorbate-20), a polyoxyethylene (20) sorbitan monopalmitate (polysorbate-40), a polyoxyethylene (20) monostearate (polysorbate-60), a polyoxyethylene (20) monooleate (polysorbate-80), octyl glucoside, octyl thioglucoside, 3-[(3-cholamidopropyl) dimethylammonio]-1propanesulfonate (CHAPS), 3-[(3-cholamidopropyl)dimethylammonio}-2-hydroxy-1-propanesulfonate (CHAPSO) and combinations thereof.

In some preferred forms of this aspect, the process further includes a size-reduction process. In general, any size reduction process can be employed. Preferred size-reduction processes are selected from the group consisting of grinding, milling, chopping, cutting, dicing, shredding, emulsifying, homogenizing, high pressure homogenizing and combinations thereof.

Preferred proteolytic enzymes are selected from the group consisting of endoproteases, exoproteases, exogenous enzymes, endogenous enzymes, and combinations thereof. Preferred endoprotease enzymes are selected from the group consisting of bromelians, cathepsin, calpain, ficain, chymopapain, streptopain, papain subtilisins, alcalase and keratinase and combinations thereof.

In some preferred forms, the proteinaceous mixture is contacted and mixed with more than one proteolytic enzyme.

The size-reduction process can be carried out at any time including before, and/or during, and/or after contacting the proteinaceous mixture with the proteolytic enzyme.

In some preferred forms, the food protein ingredient is further processed through centrifugation, filtration, or decanting.

In another aspect of the present invention, a food ingredient composition produced from the aspects and forms described above preferably has at least about 85% protein digestibility based on the 2-step Boisen method. Even more preferably, a food ingredient composition produced from the aspects and forms described above preferably has from about 90% to about 100% protein digestibility based on the 2-step Boisen method.

In some preferred forms of the present invention, the food ingredient composition includes compositions wherein at least 2% of the total amino acids are sulfur-containing amino acids.

In other preferred forms, the food ingredient composition includes a quantity of available free amino acids.

In another aspect of the present invention, a process for preparing a food protein ingredient is provided. In general the process includes the steps of providing a quantity of a protein-containing material (which can be any raw material containing a quantity of protein), wherein the protein-containing material contains keratin; reducing the particle size of the protein-containing material; contacting the protein-containing material with a quantity of water to create a proteinaceous mixture; mixing a quantity of a proteolytic enzyme with the proteinaceous mixture to produce a protein and enzyme mixture; processing the protein and enzyme mixture through a size-reduction process to produce a size reduced protein and enzyme mixture; and incubating the size-reduced protein and enzyme mixture for a time sufficient to produce the food protein ingredient.

In some forms, the process further includes the step of contacting the protein-containing material with a reducing agent.

Preferred reducing agents are selected from the group consisting of sodium metabisulfite, sodium sulfite, sodium bisulfite, calcium sulfite, phosphites, 2-mercaptoethanol, Bis(2-mercaptoethyl)sulfone, 2,3-dimercapto-1-propanol, dithiothreitol, dithiobutylamine, L-cysteine, cysteine ethyl ester, cysteine methyl ester, trialkylphosphines, tris(2-carboxyethyl) phosphine hydrochloride, and combinations thereof.

In some forms, the process may further include the step of contacting the protein-containing material with a chaotropic agent.

Preferred chaotropic agents are selected from the group consisting of urea, thiourea, guanidine salts, and combinations thereof.

In some forms, the process may further include the step of contacting the protein containing material with a detergent.

Preferred detergents are selected from the group consisting of sodium dodecyl sulfate (SDS), ethyl trimethyl ammonium bromide, Triton X-100, (1,1,3,3-tetramethylbutyl)phenyl-polyethylene glycol, Polyethylene glycol tert-octylphenyl ether sold by under the trademark Triton® X-114 by The Dow Chemical Company and its licensees, a polyoxyethylene (20) sorbitan monolaurate (polysorbate-20), a polyoxyethylene (20) sorbitan monopalmitate (polysorbate-40), a polyoxyethylene (20) monostearate (polysorbate-60), a polyoxyethylene (20) monooleate (polysorbate-80), octyl glucoside, octyl thioglucoside, 3-[(3-cholamidopropyl) dimethylammonio]-1propanesulfonate (CHAPS), 3-[(3-cholamidopropyl)dimethylammonio}-2-hydroxy-1-propanesulfonate (CHAPSO) and combinations thereof.

Preferred proteolytic enzymes are selected from the group consisting of endoproteases, exoproteases, exogenous enzymes, endogenous enzymes, and combinations thereof. Preferred endoprotease enzymes are selected from the group consisting of bromelians, cathepsin, calpain, ficain, chymopapain, streptopain, papain subtilisins, alcalase and keratinase and combinations thereof.

The size reduction process can include any conventional process for reducing the size. Preferred size-reduction processes are selected from the group consisting of grinding, milling, chopping, cutting, dicing, shredding, emulsifying, homogenizing, high pressure homogenizing and combinations thereof. The size-reduction process can be carried out before, and/or during, and/or after contacting the proteinaceous mixture with the proteolytic enzyme.

In some preferred forms, the proteinaceous mixture is contacted and mixed with more than one proteolytic enzyme.

In some preferred forms, the process may further include the step of heating the protein-containing material.

In some preferred forms, the food protein ingredient is further processed through centrifugation, filtration, or decanting.

In another aspect, the present invention provides a food ingredient composition produced from a process described herein wherein the food ingredient has at least about 85% protein digestibility based on the 2-step Boisen method. Preferably, the food ingredient has from 90% to about 100% protein digestibility based on the 2-step Boisen method.

In some preferred forms, at least 2% of the total amino acids of the food ingredient composition are sulfur-containing amino acids.

In some preferred forms, the food ingredient composition includes a quantity of available free amino acids.

In another aspect, the present invention provides a process for preparing a food protein ingredient. In general, the process includes the steps of providing a quantity of a protein-containing material (which includes any raw material containing a quantity of protein), wherein the protein-containing material contains keratin; contacting the protein-containing material with a quantity of water; heating the protein-containing material to create a proteinaceous mixture; mixing a quantity of a proteolytic enzyme with the proteinaceous mixture to produce a protein and enzyme mixture; and, incubating the protein and enzyme mixture for a time sufficient to produce the food protein ingredient.

In some preferred forms, the process may further include contacting the protein-containing material with a reducing agent. Preferred reducing agents are selected from the group consisting of sodium metabisulfite, sodium sulfite, sodium bisulfite, calcium sulfite, phosphites, 2-mercaptoethanol, Bis(2-mercaptoethyl)sulfone, 2,3-dimercapto-1-propanol, dithiothreitol, dithiobutylamine, L-cysteine, cysteine ethyl ester, cysteine methyl ester, trialkylphosphines, tris(2-carboxyethyl) phosphine hydrochloride, and combinations thereof.

In some preferred forms, the process may further include the step of contacting the protein-containing material with a chaotropic agent. Preferred chaotropic agents are selected from the group consisting of urea, thiourea, guanidine salts, and combinations thereof.

In some preferred forms, the process may further include the step of contacting the protein-containing material with a detergent. Preferred detergents are selected from the group consisting of sodium dodecyl sulfate (SDS), ethyl trimethyl ammonium bromide, Triton X-100, (1,1,3,3-tetramethylbutyl)phenyl-polyethylene glycol, Polyethylene glycol tert-octylphenyl ether sold by under the trademark Triton® X-114 by The Dow Chemical Company and its licensees, a polyoxyethylene (20) sorbitan monolaurate (polysorbate-20), a polyoxyethylene (20) sorbitan monopalmitate (polysorbate-40), a polyoxyethylene (20) monostearate (polysorbate-60), a polyoxyethylene (20) monooleate (polysorbate-80), octyl glucoside, octyl thioglucoside, 3-[(3-cholamidopropyl) dimethylammonio]-1 propanesulfonate (CHAPS), 3-[(3-cholamidopropyl)dimethylammonio}-2-hydroxy-1-propanesulfonate (CHAPSO), and combinations thereof.

In some preferred forms, the process may further include a size-reduction process. Preferred size-reduction processes are selected from the group consisting of grinding, milling, chopping, cutting, dicing, shredding, emulsifying, homogenizing, high pressure homogenizing and combinations thereof.

Preferred proteolytic enzymes are selected from the group consisting of endoproteases, exoproteases, exogenous enzymes, endogenous enzymes, and combinations thereof. Preferred endoprotease enzymes are selected from the group consisting of bromelians, cathepsin, calpain, ficain, chymopapain, streptopain, papain subtilisins, alcalase and keratinase and combinations thereof.

In some preferred forms, the proteinaceous mixture can be contacted and mixed with more than one proteolytic enzyme.

The size-reduction process can be carried out before, and/or during, and/or after contacting the proteinaceous mixture with the proteolytic enzyme.

In some preferred forms, the food protein ingredient can be further processed through centrifugation, filtration, or decanting.

In another aspect, the present invention provides a food ingredient composition produced from a process described herein wherein the food ingredient has at least about 85% protein digestibility based on the 2-step Boisen method. In preferred forms, the food ingredient will have from 90% to about 100% protein digestibility based on the 2-step Boisen method.

In some preferred forms, the food ingredient composition of the invention will have at least 2% of the total amino acids therein be sulfur-containing amino acids.

In some preferred forms, the food ingredient will include a quantity of available free amino acids.

DETAILED DESCRIPTION

The present invention provides a method for producing a food protein ingredient and the resultant food protein ingredient. The method of producing food protein ingredients from keratin-containing raw materials involves the steps of first, pretreatment of a keratin-containing raw material to break the disulfide bonds and denature the keratin protein, next, enzyme hydrolysis of the pretreated material, which may include size reduction of the hydrolysate, followed by post-treatment of the hydrolyzed material. It is envisioned that the method for producing the food protein ingredient may be carried out via a continuous, batch-wise or a combination of both types of processing.

A quantity of keratin-containing material is provided in a suitable heat and chemical resistant containment vessel typical of standard vessels used in the industry, such as, but not limited to a stainless steel tank. The protein-containing material may include any protein material known in the industry to contain keratin, including but not limited to feathers, hair, fur, wool, bristles, horns, hooves, nails, claws, beaks, outer layer of animal skin, tortoise and turtle shells, whale baleen porcupine quills, scales or any other suitable keratin-containing material or mixtures thereof. While keratin-containing material is one protein source, any suitable raw material containing a quantity of protein could be used, including but not limited to animal sources, plant sources, single cell organisms or combinations thereof.

Proteins generally consist of a plurality of peptides linked through peptide bonds. Proteins may comprise one or more peptide chains and generally fold into complex higher order structures. These higher order structures are generally held together by five main interactions: (1) disulfide bonds, (2) ionic interactions (such as salt bridging); (3) van der Walls forces (including dipole-dipole interactions, induced dipole interactions, and London dispersion forces); (4) hydrogen bonding interactions (including hydrogen bonds); and (5) hydrophobic interactions.

The material is first contacted with a quantity of an agent capable of breaking disulfide bonds. In one embodiment the agent is any agent used for sulfitolysis. In another embodiment the agent is a reducing agent in an aqueous form which allows the reducing agent to be sprayed on the material. The amount of a liquid component mixed with the reducing agent will be dependent on the reducing agent used, for example, a solution of from about 9% to about 10% w/v of the reducing agent to water can be used. In an alternative embodiment, the reducing agent can be in any form, such as a powder or gas that allows the reducing agent to contact the protein-containing material. The reducing agent can be any agent known or used in the industry for breaking disulfide bonds in keratin structure.

In one embodiment, the reducing agent is a food grade or non-food grade product, including but not limited to sulfite compounds such as sodium metabisulfite, sodium sulfite, sodium bisulfite, calcium sulfite, phosphites, 2-mercaptoethanol, Bis(2-mercaptoethyl)sulfone, 2,3-dimercapto-1-propanol, dithiothreitol, dithiobutylamine, L-cysteine, cysteine ethyl ester, cysteine methyl ester, trialkylphosphines, tris(2-carboxyethyl) phosphine hydrochloride, and combinations thereof. Where the reducing agent is a non-food grade product, it is foreseen that any residual quantities of the non-food grade reducing agent may be removed from the final product, for example, by filtration, dialysis, evaporation or any other suitable means. The reducing agent is added in an amount sufficient to break the disulfide bonds present in the protein-containing material. In one embodiment the amount of reducing agent is from about 0.01% to about 1.0% w/w of dry keratin weight.

In one embodiment the protein-containing material was added to the containment vessel with an amount of water carried in the raw keratin that resulted in a mixture having about 36% to about 90% protein-containing material to about 10% to about 64% water. In other embodiments, the protein-containing material was added with an amount of water that resulted in a mixture having about 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89% or 90% protein-containing material to about 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64% water. One preferred range includes about 36% to about 40% protein and 60% to about 64% water. It is also foreseen that further concentration of the mixture could be accomplished by spray drying the protein-containing material prior to addition. In another embodiment the protein-containing material was added with an amount of water that resulted in a mixture having about 90% or 89%, or 88%, or 87%, or 86%, or 85%, or 84%, or 83%, or 82%, or 81%, or 80%, or 79%, or 78%, or 77%, or 76%, or 75%, or 74%, or 73%, or 72%, or 71%, or 70%, or 69%, or 68%, or 67%, or 66%, or 65%, or 64%, or 63%, or 62%, or 61%, or 60%, or 59%, or 58%, or 57%, or 56%, or 55%, or 54%, or 53%, or 52%, or 51%, or 50%, or 49%, or 48%, or 47%, or 46%, or 45%, or 44%, or 43%, or 42%, or 41%, or 40%, or 39%, or 38%, or 37%, or 36% protein-containing material to about 0%, to 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83% 84%, 85%, 86%, 87%, 88%, or 89% water.

It is foreseen that in certain embodiments water may be added after the protein-containing material is contacted with the agent used for sulfitolysis. This step may also disrupt ionic interactions, hydrogen bonding interactions, van der Walls interactions, and hydrophobic interactions.

In another embodiment, a chaotropic agent and or a detergent composition may be combined with or added to the reducing agent to aid in disrupting the interactions involved in the protein structure. Detergents are amphipathic molecules containing both a non-polar tail and a polar head. They may be ionic (anionic or cationic), nonionic or zwitterionic. Suitable detergent compositions include, but are not limited to sodium dodecyl sulfate (SDS), ethyl trimethyl ammonium bromide, Triton X-100, (1,1,3,3-tetramethylbutyl)phenyl-polyethylene glycol, Polyethylene glycol tert-octylphenyl ether sold by under the trademark Triton® X-114 by The Dow Chemical Company and its licensees, a polyoxyethylene (20) sorbitan monolaurate (polysorbate-20), a polyoxyethylene (20) sorbitan monopalmitate (polysorbate-40), a polyoxyethylene (20) monostearate (polysorbate-60), a polyoxyethylene (20) monooleate (polysorbate-80), octyl glucoside, octyl thioglucoside, 3-[(3-cholamidopropyl) dimethylammonio]-1propanesulfonate (CHAPS), 3-[(3-cholamidopropyl)dimethylammonio]-2-hydroxy-1-propanesulfonate (CHAPSO), and combinations thereof In embodiments where the protein is a keratin, the chaotropic agent acts to disrupt the well-packed beta-sheet structure of the keratin. The chaotropic agent acts to disrupt the protein structures by destabilizing interactions mediated by noncovalent forces i.e. hydrogen bonding interactions, van der Waals forces, hydrophobic interactions, and ionic interactions. By disrupting the noncovalent interactions, the chaotropic agent enables additional solvent to penetrate the beta sheet structure of the keratin. This allows proteins to dissolve more easily and results in solubilization of additional quantities of protein. The chaotropic agent can be incorporated into a mixture with the reducing agent, such as in a spray, or administered alone to the protein-containing material before or after application of the reducing agent. Any chaotropic agent may be used and selection of the desired chaotropic agent will depend on the proteinaceous starting material used and the desired end product. In one embodiment a food grade chaotropic agents, for example, urea, thiourea, guanidine salts, or combinations thereof can be used. The amount of chaotropic agent will also depend on the proteinaceous starting material used and the desired end product, but can include an amount up to about 1% by weight of the proteinaceous material.

The sprayed material is next heated to create a proteinaceous mixture. Heating the mixture increases the rate of reaction of the reducing agent as well as acts to hydrolyze the protein by disrupting the noncovalent interactions responsible for the higher order structure. The heat further acts to soften the keratin structure. Steam is a preferred heat source, although it is foreseen that other suitable means of heat known in the industry could also be employed. Steam heat allows for greater penetration of the heat within the proteinaceous material and typically decreases treatment time. The heat is also important to reduce or eliminate microbial pathogens found on or within the proteinaceous material. By limiting the heat energy input of the reaction, the steam also serves to reduce the production of detrimental amino acids. Low pressure, high volume steam is preferred, particularly highly saturated steam, as it increases heat transfer and allows minimal high temperature exposure. In another embodiment superheated steam treatment may also be used.

The steam preferably has a temperature of from about 148° C. to about 157° C. and may be introduced via a perforated plate at the bottom of the tank or in any other manner designed to enable the steam to contact and penetrate the mass of keratin-containing material. Steam is supplied to the pretreated mixture until the mixture reaches a temperature of from about 85° C. to about 95° C. During the initial pretreatment with the reducing agent and heat treatment the proteinaceous material can be agitated, such as by stirring to allow for continuous mixing of the proteinaceous material. Continuous mixing will provide even distribution of the selected reducing agent as well as better penetration of the steam heat.

Heat is generally supplied for a period of from about 5 to about 30 minutes and the high temperature of the heated material can be maintained by insulation methods before the next process step. It is foreseen that the effects of the steam may be maintained by insulation methods for a period of up to about 2.0 hours. In another embodiment heat is generally supplied from about 15 to about 30 minutes. The duration of the heat treatment will depend on a number of processing variables, such as, but not limited to, the heating method, the containment vessel, agitation during the heating step, the transportation period before the next process step, and the reducing and/or detergent and/or chaotropic agents used. In another embodiment, it is also foreseen that the pretreatment denaturation step could be conducted under non-ambient conditions, such as in a low oxygen environment or under elevated pressure.

In the event that there is a substantial delay between collection of the raw keratin-containing material and pretreatment, the material may be subjected to rapid cooling, for example, by dry ice or liquid nitrogen to reduce microbial activity.

Optionally during pretreatment, up to about 50% of another protein source may be mixed in with the keratin-containing material. In one embodiment a quantity of from about 0.01% to about 50% of another protein source may be added. In another embodiment, a quantity of from about 1% to about 50% of another protein source may be added. In another embodiment, a quantity of from about 10% to about 50% of another protein source may be added. In another embodiment, a quantity of from about 20% to about 50% of another protein source may be added. In another embodiment, a quantity of from about 30% to about 50% of another protein source may be added. In another embodiment, a quantity of from about 40% to about 50% of another protein source may be added. In another embodiment, a quantity of from about 0.01% to about 30% of another protein source may be added. In another embodiment, a quantity of from about 1% to about 30% of another protein source may be added. In another embodiment, a quantity of from about 10% to about 30% of another protein source may be added. In another embodiment, a quantity of from about 20% to about 30% of another protein source may be added. In another embodiment, a quantity of from about 25% to about 30% of another protein source may be added. Any keratin-containing material may be used, for example, spent hens; animal hair, bristles, wool, fur, or any other animal material, including but not limited to animal blood, viscera, outer layer of animal skin, heads, feed, or fish viscera, for example, viscera from cold water fish, may also be included. The desired end product amino acid profiles will dictate the protein starting material to be used, thereby creating and enhancing the balance of the end product. In addition to keratin-containing materials, any other proteinaceous material or protein source may also be added to the keratin-containing material such as, for example, plants, plant derivatives, seeds, single cell organisms, microalgae, and macroalgae.

In another embodiment optional steps during pretreatment that may be undertaken to shorten reaction time include reducing the size of the raw material by pre-grinding, milling, chopping, cutting, dicing, shredding, emulsification, homogenization, high pressure homogenization or the like, or any combination thereof before or after commencing the pretreatment or during the pretreatment stage. The size reduction may be accomplished with any effective equipment known in the art, such as a granulator, knife, cutter, dicer, slitter, chopper, grinder, mill emulsifier, homogenizer, high pressure homogenizer, or the like. The material can be pre-treated with ultrasound, pulsewave, gas, superheated steam, liquid nitrogen or dry ice prior to size reduction, or size reduction can be accomplished under refrigerated or cryogenic conditions to facilitate further size reduction in a single pass or multiple passes. The material can also be size-reduced in either a wet, or damp, or dried state. The size of the material may also be reduced by emulsifying the mixture to a size of less than about 20 mm, preferably less than about 10 mm, more preferably less than about 5 mm, more preferably less than about 1 mm and even more preferably to a size of less than about 0.05 mm. The size of the material may also be reduced by emulsifying the mixture to a size of less than about 19 mm, 18 mm, 17 mm, 16 mm, 15 mm, 14 mm, 13 mm, 12 mm, 11 mm, 10 mm, 9 mm, 8 mm, 7 mm, 6 mm, 5 mm, 4 mm, 3 mm, 2 mm, 1 mm, 0.9 mm, 0.8 mm, 0.7 mm, 0.6 mm, or 0.5 mm, 0.4 mm, 0.3 mm, 0.2 mm, 0.1 mm, or 0.05 mm.

In the next step, the pretreated material is subject to enzyme hydrolysis. In one embodiment the pretreated material comprises from about 20% to about 45% dry matter. It is foreseen that the pretreated material may also comprise from about 25% to about 40% dry matter, or from about 30% to about 35% dry matter. In certain embodiments, the pretreated material comprises from about 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, or 44% to about 45% dry matter. In certain embodiments, the pretreated material comprises from about 25%, 26%, 27%, 28%, 29%, 30%, 31%, 32%, 33%, 34%, 35%, 36%, 37%, 38%, or 39% to about 40% dry matter. In certain embodiments, the pretreated material comprises from about 30%, 31%, 32%, 33%, or 34% to about 35% dry matter. In one embodiment any proteolytic enzyme known in the art can be used, including but not limited to proteases, such as endoproteases, exoproteases, exogenous enzymes, endogenous enzymes, or combinations thereof. The endoproteases may be used either alone or in combination and include, but are not limited to, bromelians, cathepsin, calpain, ficain, chymopapain, streptopain, papain subtilisins, alcalase and keratinase. The amount of endoprotease(s) used will depend on the starting material and the desired end product, but will include an amount from about 0.3% to about 13% w/w of dry protein weight. In certain embodiments, the amount of endoproteases(s) will include an amount of from about 0.5%, or 1%, or 2%, or 3%, or 4%, or 5%, or 6%, or 7%, or 8%, or 9%, or 10%, or 11%, or 12% to about 13% w/w of dry protein weight. In another embodiment a combination of proteases is preferred because the combination can synergistically hydrolyze the keratin in an efficient manner. If a combination of endoproteases is used the amount of each endoprotease will be from about 0% to about 7% w/w of dry protein weight. In another embodiment exoproteases may be added, preferably at a later stage of hydrolysis when a greater number of peptides are made available from earlier proteolysis, to further reduce protein size to generate peptides of desired characteristics, as well as for production of hypoallergenic and/or anallergenic protein ingredients. Any suitable enzyme products containing mixtures of purified endo and exoproteases may be employed, for example, Flavourzyme® and Kojizyme (Novozymes A/Z, Bagsvaerd, Denmark) and Validase FP (DSM, Heerland, Netherlands), and exopeptidases such as leucine aminopeptidase. Alternatively, endogenous enzymes carried in raw material may be used to reduce the required dosages of added endoproteases. These may be obtained from animal viscera, for example, proteases, carbohydrases and/or lipases.

During enzymatic hydrolysis it is important to ensure the conditions are selected to produce optimum results. The conditions will depend on the enzymes used for hydrolysis, however, the pH will typically be from about 6.0 to about 8.0 with a temperature range of from about 55° to about 80° C. In certain embodiments, the pH will typically be from about 6.5, 6.6, 6.7, 6.8, 6.9, 7, 7.1, 7.2, 7.3, 7.4, 7.5, 7.6, 7.7, 7.8, 7.9 to about 8.0. In certain embodiments, the temperature range will be from about 60°, 65°, 70°, or 75°, to about 80° C. Both the pH and temperature will depend on the enzyme (s) selected with conditions tailored to ensure optimum results. Higher hydrolysis temperatures may be employed if this raises the conversion rate without generating antinutrients such as lysinoalanine and lanthionine. Duration of hydrolysis will depend upon the starting material used as well as the desired end product, but may be from about 30 minutes to about 6 hours. In order to maintain the commercial viability of the process, in certain embodiments, the time of hydrolysis is limited to less than about 4 hours. In other embodiments, the time of hydrolysis may be from about 2 hours to about 3 hours. In other embodiments, the time of hydrolysis may be from about 30 minutes to about 2 hours.

The hydrolysis step preferably includes emulsification to reduce the particle size of the proteinaceous mixture. Any suitable emulsification processing equipment may be employed, such as, for example, emulsification equipment produced by Stephan Food Processing Machinery (Symnpak Group, Hameln, Germany). Emulsification processing may be carried out before or after the protein mixture is contacted with the enzymatic reaction and emulsification processing may continue in conjunction with the proteolytic enzyme reaction with the protein slurry. In another embodiment emulsification may be carried out before the hydrolysis step. In one embodiment, the emulsification will reduce the particle size to less than about 20 mm, or less than about 10 mm or less than about 5 mm, or less than about 1 mm or less than about 0.5 mm. In certain embodiments, the emulsification will reduce the particle size to less than about 20 mm, 19 mm, 18 mm, 17 mm, 16 mm, 15 mm, 14 mm, 13 mm, 12 mm, 11 mm, 10 mm, 9 mm, 8 mm, 7 mm, 6 mm, 5 mm, 4 mm, 3 mm, 2 mm, 1 mm, 0.9 mm, 0.8 mm, 0.7 mm, 0.6 mm, or less than about 0.5 mm.

Following the enzyme hydrolysis, the protein material is processed in accordance with typical industry practices and procedures to ensure shelf stability. In one embodiment the hydrolyzed product is acidified to a pH of less than about 2.5 with phosphoric acid and heated at 90° C. for about 10 minutes to kill the enzymes and bacteria. Heating time may vary, and is preselected to avoid production of undesirable byproducts. Alternatively, the hydrolyzed product may be directly dried, preferably using a vacuum dryer to take advantage of residual heat in the product. Other drying technology known in the industry may be used, such as, but not limited to, spray drying, drum drying, superheated steam drying, or fluidized layer drying. The hydrolyzed product may also be subject to centrifugation, filtration and/or ultra-filtration, or decanting or any combination of the foregoing prior to drying.

Reducing sugars, yeast and nucleotides may also be added to the liquid hydrolysate base to further react at high temperature and pressure to enhance the palatability of the protein product. Volatiles, semi-volatiles and other chemical compositional attributes can be measured to correlate the feeding performance of food products comprising such protein ingredients.

The preferred protein ingredient product made in accordance with the foregoing method is stable at room temperature, highly palatable and contains from about 85% to about 100% protein digestibility. In another embodiment, the product contains from about 90% to about 100% protein digestibility. In other embodiments, the product contains from about 85%, 86%, 87%, 88%, 89%, 90%, 91%, 92%, 93%, 94%, 95%, 96%, 97%, 98%, or 99% to about 100% protein digestibility. In still other embodiments, the product contains at least about 93% protein digestibility. All of the foregoing digestibility percentages are as measured by the 2-step enzymatic method described by Boisen and Fernandez (1995).

The preferred protein ingredient product has at least about 2% sulfur-containing amino acids in total amino acids. At least about 90% of the residual protein comprises short chain peptides, having a molecular weight of less than about 10 kDa. At least about 80% of the residual protein comprises peptides having a molecular weight in the range of from about 1200 Da to about 1500 Da, and preferably in the range of from about 1000 Da to about 1400 Da. In certain embodiments the peptides have a molecular weight in the range of from about 1000, 1100, 1200, 1300, or 1400, to about 1500 Da. At least about 2% of the residual protein size has a molecular weight of less than about 230 Da. At least about 80% of the particle size is less than 100 μm. The product contains a variety of available free amino acids, including but not limited to Leucine, Arginine, Glutamic acid, Glycine, Serine and Phenylalanine. In addition, all of the biogenic amines have a concentration of less than about 10 ppm.

Such a highly digestible protein food product having a Boisen digestibility exceeding about 85% is typically not achieved through conventional processes. As previously discussed, other known processes that employ harsh acid or base hydrolysis, such as, for example HCL and NAOH or KCL or KOH, yield products containing residual salts. These salts are particularly expensive to remove by centrifugation or evaporation. The protein product ingredient yielded by the disclosed method and having protein digestibility greater than about 85% as measured by the 2-step Boisen method is substantially free of residual salts.

At least about 85% of the residual protein size of the protein product ingredient produced by the disclosed method has a molecular weight of from about 1000 Da to about 1400 Da.

In certain embodiments, a viscosity modifier may be added to the hydrolyzed materials in order to produce a viscosity increase-resistant protein hydrolysate. A chelating agent such as a pyrophosphate salt may also be added to the hydrolysate to reduce the magnesium or calcium content of the hydrolysate. Addition of a pyrophosphate salt reduces bricking or solidification of the hydrolysate, thereby improving storage of the hydrolysate. Examples of pyrophosphates may include, but are not limited to, alkali metal or ammonium pyrophosphate, tetrasodium pyrophosphate, tetrapotassium pyrophosphate, or tetraammonium pyrophosphate. Insoluble magnesium or calcium salts may then be removed from the hydrolysate by subsequent processing.

While the invention has been explained in relation to exemplary embodiments, it is to be understood that various modifications thereof will become apparent to those skilled in the art upon reading the description. Therefore, it is to be understood that the invention disclosed herein is intended to cover such modifications as fall within the scope of the claims.

Example I

Pretreatment 372 kg of freshly-processed raw feathers were collected at 36-38° C. 0.74 kg of $Na_2S_2O_5$ solubilized in 8 liters of water was sprayed onto the raw feathers layer by layer during the course of transferring the feathers into two 378-liter stainless steel containment vessels or tanks. Each of the tanks was equipped with a perforated plate positioned above the conical bottom portion of the tank. High volume, low pressure (HVLP) steam at 148-157° C. was injected into the feather mass from a discharge pipe located at the bottom of each tank. The steam passed through the respective perforated plates to disperse through the feathers. The steaming process was continued for 20-30 minutes until the feather temperature as measured on the top layer reached 90-93° C. The treated and steamed feathers remained in the tank during the subsequent 2 hours until further processing steps were conducted. At the end of this 2 hour period, the temperature of the feathers at the top of the collection tanks was down to 63-71° C., and feather dry matter comprised 36-40% w/w.

Enzyme Hydrolysis 114 liters of water were heated to 60° C. in a reaction vessel having a 568 liter capacity. 1.5% dry keratinase enzyme (w/w total raw feathers) solubilized in 3 liters of water, and 1% liquid papain (w/w total raw feathers) were added to the vessel. Next 372 kg of the feather matter from the pretreatment step were loaded manually into the reaction vessel over a period of 1 hr, while mixing at 40 rpm by a wall scraper. 57 liters of additional water were added during the feather loading in order to maintain a swirling mixture. Following loading of the feather matter into the reaction vessel, 1.5% dry keratinase (w/w total raw feathers) solubilized in 3 liter of water, and 1% liquid papain (w/w total raw feathers) were added to the vessel. The mixture was allowed to react at 60° C. for 1 hr, then circulated to an emulsifier having dual cutting knife plates of 1.3 mm and 0.5 mm for 0.5 hr, and the mixture was allowed to react at 60° C. for an additional period of 1.25 hr. The temperature of the mixture was raised to 80° C. over a period of 5 minutes by direct injection of 15 liters of steam from a discharge pipe located at the bottom of the kettle. The mixture was allowed to react at 80° C. for 1.25 hr. Phosphoric acid (5.7% w/w of total raw feathers) was then added to the mixture to reduce the pH to less than 2.5. Sorbic acid (1% w/w of total mixture) was added to inhibit mold growth. The temperature of the mixture was raised to 90° C. over a period of 5 minutes by direct injection of 15 liters of steam, and the temperature was held at 90° C. for 10 minutes to denature the enzymes. The mixture was then cooled to less than 32° C., and a natural antioxidant (0.15% w/w of total mixture) was added. The final liquid slurry was then determined to have 30% dry matter, up to 25% protein, and up to 9.0% ash. The final product was also room temperature stable, with a target shelf life of up to 12 months. It is foreseen that the acid step may be omitted if the ingredient is prepared in accordance with this example for use immediately following production as an inclusion in a food or pet food product that will be subject to further processing by extrusion or retorting.

Example II Using a Reducing Agent

Pretreatment 372 kg of freshly-processed raw feathers are collected at 36-38° C. 0.74 kg of $Na_2S_2O_5$ solubilized in 8 liters of water is sprayed onto the raw feathers layer by layer during the course of transferring the feathers into two 378-liter stainless steel containment vessels or tanks. The treated feathers remain in the tank during the subsequent 2 hours, and excess water from settlement of the feathers is allowed to drain off during that time. At the end of the 2 hour period, feather dry matter comprises 36-40% w/w.

Enzyme Hydrolysis 114 liters of water are heated to 60° C. in a reaction vessel having a 568 liter capacity. 1.5% dry keratinase enzyme (w/w total raw feathers) solubilized in 3 liters of water, and 1% liquid papain (w/w total raw feathers) are added to the vessel. Next 372 kg of the feather matter from the pretreatment step are loaded manually into the reaction vessel over a period of 1 hr, while mixing at 40 rpm by a wall scraper. 57 liters of additional water are added during the feather loading in order to maintain a swirling mixture. Following loading of the feather matter into the reaction vessel, 1.5% dry keratinase (w/w total raw feathers) solubilized in 3 liter of water, and 1% liquid papain (w/w total raw feathers) are added to the vessel. The mixture is allowed to react at 60° C. for 1 hr, and the mixture is allowed to react at 60° C. for an additional period of 1.25 hr. The temperature of the mixture is raised to 80° C. over a period of 5 minutes by direct injection of 15 liters of steam from a discharge pipe located at the bottom of the kettle. The mixture is allowed to react at 80° C. for 1.25 hr. Phosphoric acid (5.7% w/w of total raw feathers) is then added to the mixture to reduce the pH to less than 2.5. Sorbic acid (1% w/w of total mixture) is added to inhibit mold growth. The temperature of the mixture is raised to 90° C. over a period of 5 minutes by direct injection of 15 liters of steam, and the temperature is held at 90° C. for 10 minutes to denature the enzymes. The mixture is then cooled to less than 32° C., and a natural antioxidant (0.15% w/w of total mixture) was added. The final liquid slurry is then determined to have 30% dry matter, 17.5% protein, and 8.3% ash. The final product is also room temperature stable, with a target shelf life of 3-6 months. It is foreseen that the acid step may be omitted if the ingredient is prepared in accordance with this example for use immediately following production as an inclusion in a food or pet food product that will be subject to further processing by extrusion or retorting.

Example III Using Emulsification

Pretreatment 372 kg of freshly-processed raw feathers are collected at 36-38° C. 0.74 kg of $Na_2S_2O_5$ solubilized in 8 liters of water was sprayed onto the raw feathers layer by layer during the course of transferring the feathers into two 378-liter stainless steel containment vessels or tanks. The feathers remain in the tank during the subsequent 2 hours and excess water from settlement of the feathers is allowed to drain off during that time. Upon completion of the 2 hour period, feather dry matter comprises 36-40% w/w.

Enzyme Hydrolysis 114 liters of water are heated to 60° C. in a reaction vessel having a 568 liter capacity. 1.5% dry keratinase enzyme (w/w total raw feathers) solubilized in 3 liters of water, and 1% liquid papain (w/w total raw feathers) are added to the vessel. Next 372 kg of the feather matter from the pretreatment step are loaded manually into the reaction vessel over a period of 1 hr, while mixing at 40 rpm by a wall scraper. 57 liters of additional water are added during the feather loading in order to maintain a swirling mixture. Following loading of the feather matter into the reaction vessel, 1.5% dry keratinase (w/w total raw feathers) solubilized in 3 liter of water, and 1% liquid papain (w/w total raw feathers) are added to the vessel. The mixture is allowed to react at 60° C. for 1 hr, then circulated to an emulsifier having dual cutting knife plates of 1.3 mm and 0.5 mm for 0.5 hr, and the mixture is allowed to react at 60° C. for an additional period of 1.25 hr. The temperature of the mixture is raised to 80° C. over a period of 5 minutes by direct injection of 15 liters of steam from a discharge pipe located at the bottom of the kettle. The mixture is allowed to react at 80° C. for 1.25 hr. Phosphoric acid (5.7% w/w of total raw feathers) is then added to the mixture to reduce the pH to less than 2.5. Sorbic acid (1% w/w of total mixture) is added to inhibit mold growth. The temperature of the mixture is raised to 90° C.

over a period of 5 minutes by direct injection of 15 liters of steam, and the temperature is held at 90° C. for 10 minutes to denature the enzymes. The mixture is then cooled to less than 32° C., and a natural antioxidant (0.15% w/w of total mixture) is added. The final liquid slurry is determined to have 30% dry matter, 17.5% protein, and 8.3% ash. The final product is also room temperature stable, with a target shelf life of 3-6 months. It is foreseen that the acid step may be omitted if the ingredient is prepared in accordance with this example for use immediately following production as an inclusion in a food or pet food product that will be subject to further processing by extrusion or retorting.

Example IV Using Pre-Hydrolysis Heating

Pretreatment 372 kg of freshly-processed raw feathers are collected at 36-38° C. 8 liters of water is sprayed onto the raw feathers layer by layer during the course of transferring the feathers into two 378-liter stainless steel containment vessels or tanks. Each of the tanks is equipped with a perforated plate positioned above the conical bottom portion of the tank. High volume, low pressure (HVLP) steam at 148-157° C. is injected into the feather mass from a discharge pipe located at the bottom of each tank. The steam passes through the respective perforated plates to disperse through the feathers. The steaming process is continued for 20-30 minutes until the feather temperature as measured on the top layer reaches 90-93° C. The treated and steamed feathers remain in the tank during the subsequent 2 hours and excess water from settlement of the feathers is allowed to drain off during that time. Upon completion of 2 hour period, the temperature of the feathers at the top of the collection tanks was down to 63-71° C., and feather dry matter comprises 36-40% w/w.

Enzyme Hydrolysis 114 liters of water are heated to 60° C. in a reaction vessel having a 568 liter capacity. 1.5% dry keratinase enzyme (w/w total raw feathers) solubilized in 3 liters of water, and 1% liquid papain (w/w total raw feathers) are added to the vessel. Next 372 kg of the feather matter from the pretreatment step are loaded manually into the reaction vessel over a period of 1 hr, while mixing at 40 rpm by a wall scraper. 57 liters of additional water are added during the feather loading in order to maintain a swirling mixture. Following loading of the feather matter into the reaction vessel, 1.5% dry keratinase (w/w total raw feathers) solubilized in 3 liter of water, and 1% liquid papain (w/w total raw feathers) are added to the vessel. The mixture is allowed to react at 60° C. for 1 hr, and the mixture is allowed to react at 60° C. for an additional period of 1.25 hr. The temperature of the mixture is raised to 80° C. over a period of 5 minutes by direct injection of 15 liters of steam from a discharge pipe located at the bottom of the kettle. The mixture is allowed to react at 80° C. for 1.25 hr. Phosphoric acid (5.7% w/w of total raw feathers) is then added to the mixture to reduce the pH to less than 2.5. Sorbic acid (1% w/w of total mixture) is added to inhibit mold growth. The temperature of the mixture is raised to 90° C. over a period of 5 minutes by direct injection of 15 liters of steam, and the temperature is held at 90° C. for 10 minutes to denature the enzymes. The mixture is then cooled to less than 32° C., and a natural antioxidant (0.15% w/w of total mixture) is added. The final liquid slurry is then determined to have 30% dry matter, 17.5% protein, and 8.3% ash. The final product is also room temperature stable, with a target shelf life of 3-6 months. It is foreseen that the acid step may be omitted if the ingredient is prepared in accordance with this example for use immediately following production as an inclusion in a food or pet food product that will be subject to further processing by extrusion or retorting.

It is to be understood that while certain forms of the method for producing food protein ingredient from keratin-containing materials has been illustrated and described herein, it is not to be limited to the specific forms or arrangement of parts described and shown.

The invention claimed is:

1. A process for preparing a food protein ingredient comprising:
   a. contacting a raw protein-containing material comprising keratin with a quantity of water to create a proteinaceous mixture;
   b. mixing a quantity of keratinase and papain with the proteinaceous mixture to produce a protein and enzyme mixture;
   c. processing the protein and enzyme mixture through a size-reduction process to produce a size-reduced protein and enzyme mixture; and
   d. next, incubating the size-reduced protein and enzyme mixture for a time sufficient to produce the food protein ingredient;
   wherein no step of the process exposes the protein-containing material to pressures greater than ambient.

2. The process of claim 1, further including mixing a quantity of the keratinase and/or papain in an aqueous solution to produce a keratinase and/or papain solution.

3. The process of claim 1, further including heating the protein-containing material.

4. The process of claim 1, further including contacting the raw protein-containing material and/or the proteinaceous mixture with a composition selected from the group consisting of a reducing agent, a chaotropic agent, a detergent, and mixtures thereof.

5. The process of claim 4, wherein the reducing agent is selected from the group consisting of phosphites, trialkylphosphines, tris(2-carboxyethyl) phosphine hydrochloride, and combinations thereof.

6. The process of claim 4, wherein the chaotropic agent is selected from the group consisting of urea, guanidine salts, and combinations thereof.

7. A food ingredient composition produced according to the process of claim 1, wherein the food ingredient has at least about 85% protein digestibility based on the 2-step Boisen method.

8. The food ingredient composition of claim 7, wherein at least 2% of the total amino acids are sulfur-containing amino acids.

9. The food ingredient composition of claim 7, wherein the food ingredient includes a quantity of available free amino acids.

* * * * *